United States Patent [19]

Hoshino et al.

[11] Patent Number: 4,912,491
[45] Date of Patent: Mar. 27, 1990

[54] APPARATUS FOR FORMING SUPERIMPOSED IMAGES

[75] Inventors: Osamu Hoshino, Tokyo; Hideaki Mitsutake, Yokohama; Yasushi Murayama, Tokyo; Ken Miyagi, Yokohama; Kazuyoshi Chiku, Tokyo; Yukio Sato, Kawasaki; Yoichi Kubota, Kawasaki; Hiroyuki Miyake, Kawasaki, all of Japan

[73] Assignee: Canon Kabushiki Kaisha, Tokyo, Japan

[21] Appl. No.: 195,802

[22] Filed: May 19, 1988

[30] Foreign Application Priority Data

| May 30, 1987 | [JP] | Japan | 62-133358 |
| May 30, 1987 | [JP] | Japan | 62-133359 |
| May 30, 1987 | [JP] | Japan | 62-133367 |

[51] Int. Cl.$^4$ .............................................. G03G 15/01
[52] U.S. Cl. .................................. 346/160; 346/153.1; 346/157; 355/202; 355/327
[58] Field of Search ............... 346/157, 153.1, 158, 346/159, 160; 355/202, 326, 327; 358/300

[56] References Cited

U.S. PATENT DOCUMENTS

| 4,660,059 | 4/1987 | O'Brien | 346/157 |
| 4,816,844 | 3/1989 | Uchida et al. | 346/160 |
| 4,819,019 | 4/1989 | Egawa et al. | 346/160 X |
| 4,821,066 | 4/1989 | Foote, Jr. et al. | 346/160 |

Primary Examiner—A. C. Prescott
Attorney, Agent, or Firm—Fitzpatrick, Cella, Harper & Scinto

[57] ABSTRACT

An image forming apparatus for forming superimposed images includes a plurality of image forming devices each for forming a different image and a registration mark, corresponding to the position of the associated image, on an image transferring medium. The registration mark is formed on a transparent part of the medium and is illuminated from below. A detector above the medium detects the position of the shadow of the registration mark for each image and the result of detection is used to adjust the position of at least one image forming device to produce proper registration between the images formed by the respective image forming devices.

21 Claims, 16 Drawing Sheets

| FIG. 8 (A) | FIG. 8 (B) |

APPARATUS FOR FORMING SUPERIMPOSED IMAGES

BACKGROUND OF THE INVENTION

1. Field of the Invention

The present invention relates to an image forming apparatus for forming images on a transfer material, and specifically relates to an image forming apparatus for forming superimposed images.

2. Related Background Art

Image forming apparatus have previously been proposed that form a color image using a plurality of image receiving media. For example such a proposal is described in Japanese Laid Open Patents Nos. 58-23074, 58-95361, 58-95362, 58-154856, 58-207021, 59-31976, 59-46659, 59-50460, and 59-42879.

This type image forming apparatus however, is characterized by a problem resulting in misregistration between the different color images. Thus proposals have also been made for preventing such misregistration by using a mechanical structure, for example as described in Japanese Laid Open Patent Nos. 59-155870, 59-155869, 59-155871, 59-204069, 59-155870, 59-168467, and 59-182139.

These described proposals are effective in preventing undesirable misregistration in certain applications. On the other hand, acceptable tolerances of misregistration between different color images in other applications range from only about 0.10 mm through about 0.15 mm. Apparatus incorporating these proposals is not accurate enough to satisfy such requirement, and therefore some problems remain. For example, instability of a transporting belt, lack of uniformity between the state after energizing a photosensitive drum and the state before deenergizing it, and instability of vertical and horizontal synchronizing signals are newly understood to affect the misregistrations of different color images even after other technical problems are solved.

Relative positions of optical systems, photosensitive drums and so on, adjusted when initially installed, may vary if the apparatus is moved from one place to another. Especially, movement of the apparatus to a non-flat support platform causes difficulty. The non-flat surface causes distortion in the apparatus. Therefore, after movement of the apparatus, very complicated and difficult readjustment is required to prevent the misregistration of different images. Moreover, in such highly precise image forming apparatus, which do not compare with conventional image forming apparatus, variation in temperature also affects the misregistration because of the thermal expansion and contraction of various components of the apparatus.

In order to avoid the above mentioned problem, registration marks should be placed on a moving material which moves to record an image, so that the apparatus can be adjusted to not produce misregistrated images by using detecting output of these registration marks.

A mono-color imaging device or tri-color imaging device is ordinarily provided with means for detecting these registration marks. When an image transferring belt is used as the image transporting material, the transferring belt is often made of polyimide film, urethane rubber film, and the like because the characteristics of such materials (Young's modulus, volume electric registance ratio, and the like) are suitable for a transferring medium.

However, these substances are usually orange colored. Therefore, it is difficult to detect yellow or magenta registration marks, because the color difference between the transferring belt and the registration marks is small.

In such case, the registration marks are placed on an intermediate transferring material which holds an image transferred from a photosensitive drum. The intermediate transferring material is ordinarily made of silicon rubber, which has desirable plasticity. However, silicone rubber is colored pink or orange. Therefore, it is also difficult for a detecting device to detect yellow or magenta registration marks.

In the printing industry, the registration marks are printed on a printing paper as well as appear in the image to be printed. In such case, a printing paper larger than image size is used, and the registration marks are printed on the edge of the printing paper. After the printing is completed, the area printed with the registration marks is cut off to provide a standard image size. However, since the printing paper is larger than that needed for the printed image size, such procedure is very wasteful. Printing paper of non-standard size is also difficult to obtain and handle. Further, a cutter device and cutting step for removing the region of the printing paper at which the registration marks are printed, are necessary, and processor control of such a device to control such step must be provided. Therefore, the structure of a image recording apparatus incorporating these devices is complicated.

SUMMARY OF THE INVENTION

It is an object of the present invention to overcome the above-mentioned shortcomings of the conventional image forming apparatus for producing superimposed images.

In accordance with a preferred embodiment of the present invention, an image forming apparatus for forming superimposed images is provided which enables a detector to accurately detect a registration mark.

In one aspect of this preferred embodiment, the present invention comprises an image holder for holding an image, a moving material for assisting in transfer of an image from the image holder, the moving material including a transparent region at which a registration mark is to be recorded; a detector for detecting the registration mark on the transparent region; and an adjusting system for adjusting the position of the image according to a detecting signal from said detector.

According to the above-mentioned feature, the image forming apparatus for producing superimposed images enables the detector to detect easily the registration mark using reflected light or transmitted light, and the correcting system can correct the position of the image using this detection output.

In accordance with another aspect, the present invention provides an image forming apparatus for forming superimposed images that produce coincident registration between images without cutting off a printing region at which the registration mark appears.

In this aspect, the present invention comprises a removing device for removing the registration mark from a printing region for the registration mark.

The foregoing summary of certain more important features of the invention is provided in order that the detailed description of the preferred embodiments thereof that follows may be better understood, and in order that the present contribution to the art may be better appreciated. There are, of course, additional features of the invention that will be described in that detailed description with reference to the accompanying drawing. Those skilled in the art will appreciate that the conception upon which this disclosure is based may readily be utilized as a basis for designing other structures or methods for carrying out the purposes of the invention. It will be understood what the claims are to be regarded as including such other constructions and methods as do not depart from the spirit and scope of the invention.

DETAILED DESCRIPTION OF THE PREFERRED EMBODIMENTS

Figure 1:
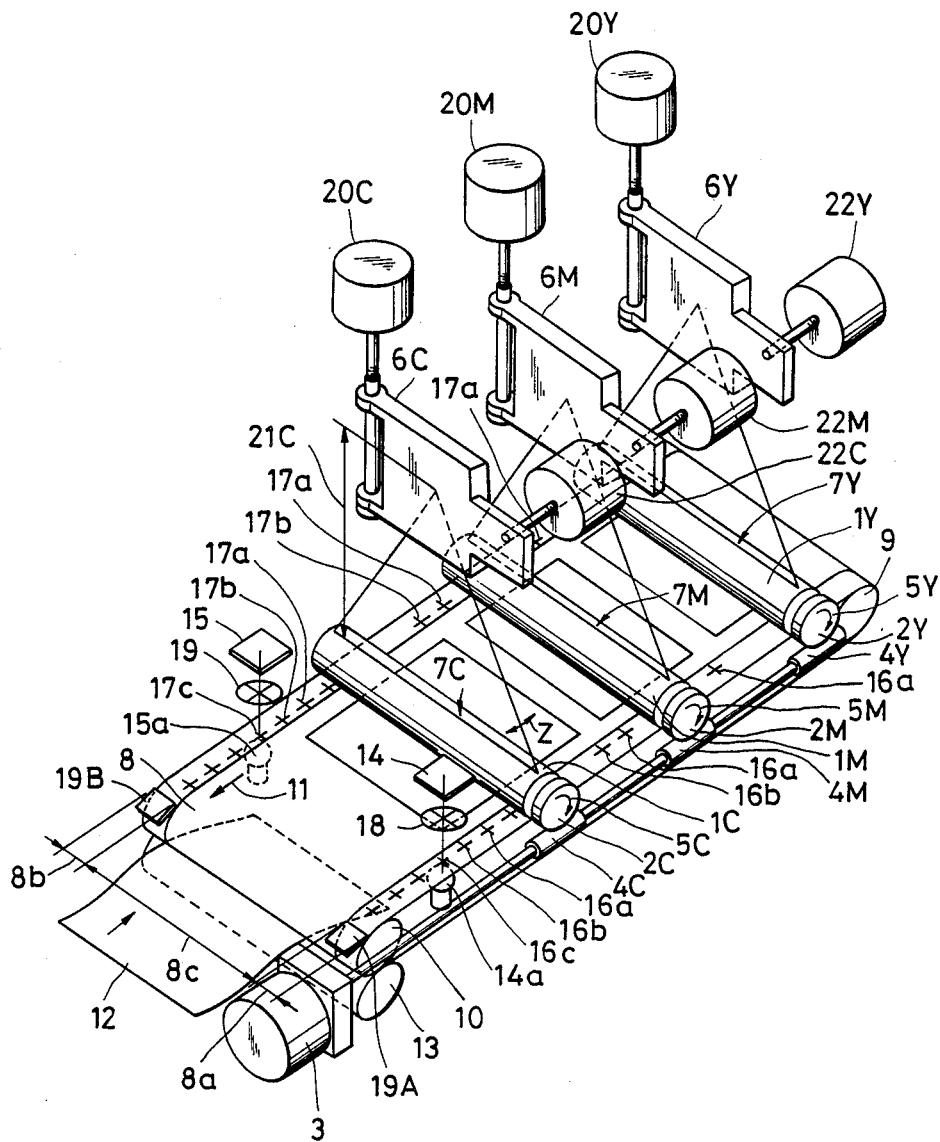
FIG. 1 is a schematic view of a color printer using a plurality of photosensitive drums.

FIG. 1 shows a color printer in accordance with the first embodiment of the present invention.

This color printer has three photosensitive drums 1Y, 1M, 1C, each of which produces a yellow, a magenta and a cyan image respectively. A motor 3 drives wormwheels 2Y, 2M, 2C via worm gears 4Y, 4M, 4C to rotate simultaneously the photosensitive drums 1Y, 1M, 1C in directions shown by arrows 5Y, 5M, 5C. Each one of three optical boxes 6Y, 6M, 6C includes a laser (not shown) for generating a laser beam and polygonal mirror (not shown) for causing the laser beam to scan the surface of an associated drum 1Y, 1M, 1C and produce respective raster lines 7Y, 7M, 7C. These raster lines are respectively used to expose the photosensitive drums 1Y, 1M, 1C.

Certain conventional devices used in the electrophotography process, such as the "Carlson Process," are installed about the photosensitive drums 1Y, 1M, 1C. However illustration of these is omitted in FIG. 1 for simplicity.

An intermediate or middle transferring belt 8, which is installed under the photosensitive drums 1Y, 1M, 1C, is supported by and around rollers 9 and 10 and moves in the direction shown by an arrow 11 in synchronization with a rotation of the drums 1Y, 1M, 1C in the directions shown by arrows 5Y, 5M, 5C.

The three images formed by on the respective photosensitive drums using the "Carlson Process," are sequentially and temporarily transferred onto the intermediate transferring belt 8 using a corona transfer method or a pressure transfer method. Then the images on the intermediate transferring belt 8 are re-transferred onto a printing paper 12 at a contact position between the roller 10 and a transferring roller 13, so that the three images Y, M, C register with one another to obtain a color image.

A pair of line- or area-imaging devices 14 and 15, constituting detecting means, comprising CCDs (Charge Coupled Devices) or MOS (Metal Oxide Silicon) devices, detect registration marks 16a, 16b, 16c, 17a, 17b, 17c on the moving belt 8 through lenses 18 and 19. The belt 8 is made so that registration marking areas 8a, 8b, which are transparent, are produced at both sides of the belt 8, and a middle image-transferring area 8c is made of non-transparent silicone rubber.

If the middle image-transferring area is made of polyimide, the registration marking areas might be of the same material as the middle image-transferring area because polyimide may be transparent.

The registration marks 16c and 17c made by using the cyan drum 1C, are cross-shaped cyan marks. Those 16a and 17a made by using the yellow drum 1Y are cross-shaped yellow marks. Those 16b and 17b made by using the magenta drum 2M are cross-shaped magenta marks. These marks and actual color images are made simultaneously.

A pair of lamps 14a and 15a are provided, as lighting means, respectively at the detecting points of the imaging devices 14 and 15. The lamps 14a and 15a light the registration marks from below. Therefore, the imaging devices 14 and 15 discriminate the registration marks not by their color but as shaded areas. Then the optical boxes 6Y, 6M, 6C are adjusted in accordance with the detected timing of the imaging devices 14 and 15.

The optical boxes 6Y, 6M, 6C respectively have a plurality of adjusting motors, including optical length adjusting motors 20Y, 20M, 20C and an optical box rotating motors 22Y, 22M, 22C. Each optical length adjusting motor 20 varies a length 21C between the laser (not shown) or the polygonal mirror (not shown) in the box and the associated photosensitive drum 1. Each optical box rotating motor 22Y, 22M, 22C turns the associated box 6 on the axis of the optical length adjusting motor 20Y, 20M, 20C. Therefore, when the rotating motor 22 rotates, the direction of the raster line rotates in the direction of an arrow Z.

A pair of cleaning blades 19A and 19B is provided for removing and wiping out the registration marks which have already been detected by the imaging devices 16 and 15. These blades are installed at the left end of the belt 8 confronting the registration marking areas 8a and 8b.

Thus, in this first embodiment of the present invention, the registration marks are detected by the imaging devices, the outputs of which are used for correcting registration. The registration marks are then removed or eliminated by the cleaning blades 19A, 19B.

The registration marking areas 8a and 8b are always cleaned before the new registration marks and new images are formed. Further, the transferring roller 13 is also always kept clean, because the registration marks are eliminated before the marks reach the roller 17.

Figure 2:
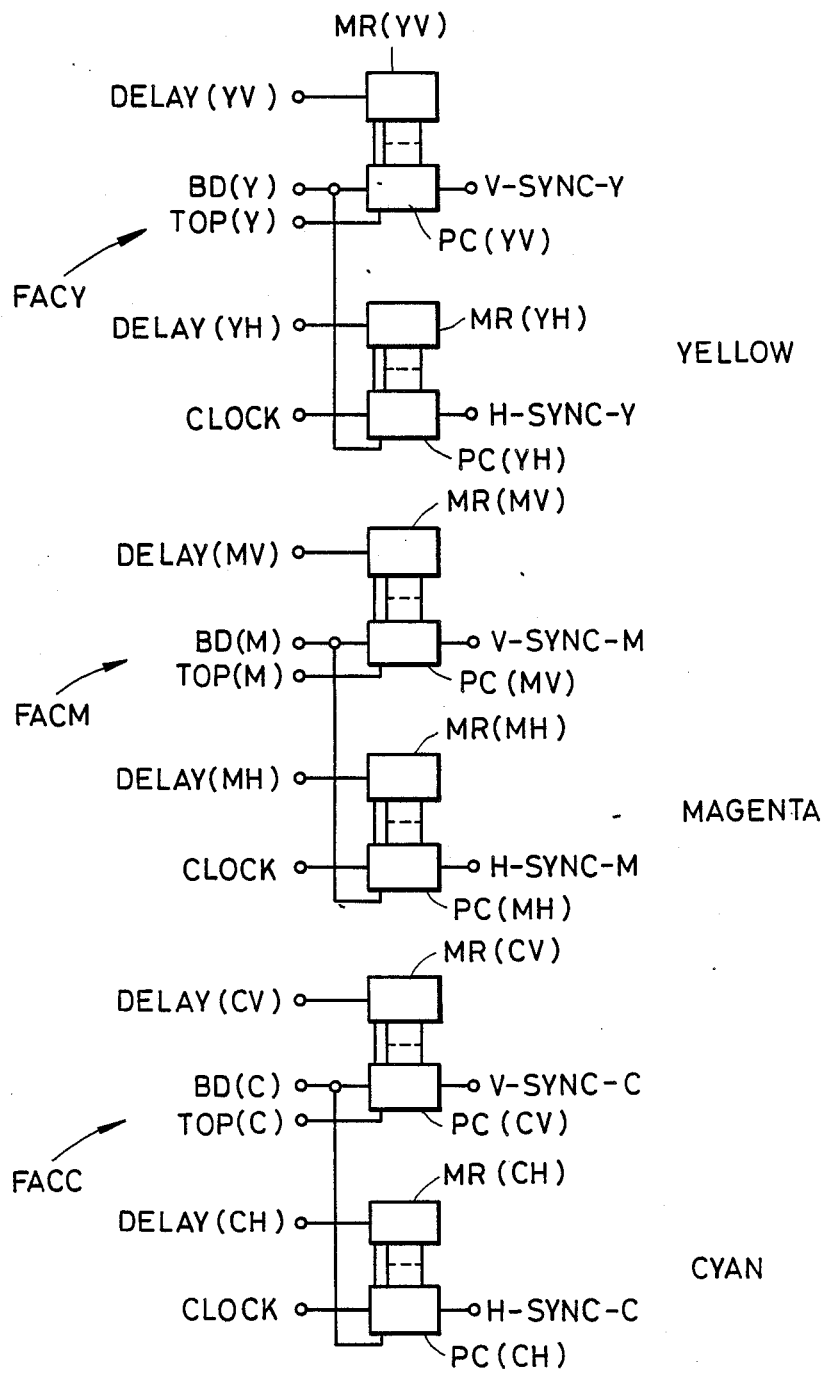
FIG. 2 is a circuit for generating a horizontal synchronizing signal and a vertical synchronizing signal for each color to be printed.

FIG. 2 shows a part of circuit for generating a horizontal syncronizing signal and vertical syncronizing signal for each color apparatus of the first embodiment of the present invention. The generating circuit has a fine adjustment circuit FACY, FACM, FACC for each color, namely, yellow (Y), magenta (M) and cyan (C). Each fine adjustment circuit has a plurality input terminals. Input signals input to these input terminals are generated by a conventional sequence controller for a laser beam printer as shown, for example, in the Japanese Laid Open Patent Nos. 59-163971 and 59-226559.

One of the input signals for each color is a vertical timing signal TOP(Y), TOP(M), TOP(C), which is not adjusted and which represents a starting time of formation of the total image in the vertical direction parallel to the moving direction of the transferring belt 8.

Another of the input signals is a horizontal timing signal BD(Y), BD(M), BD(C) which is not adjusted and which represents a starting time of formation of the master image in the horizontal direction perpendicular to the moving direction of the transferring belt 8.

Further, in accordance with the detection output of the imaging devices 14 and 15, amounts of delay of the vertical timing signals TOP(Y), TOP(M), TOP(C) in the vertical direction are provided respectively as signals DELAY(YV), DELAY(MV), DELAY(CV). The amounts represented by the signals DELAY(YV), DELAY(MV) and DELAY(CV) are respectively stored in margin registers MR(YV), MR(MV) and MR(CV). Similarly amounts of delay of the horizontal timing signals BD(Y), BD(M), BD(C) in the horizontal direction are provided respectively as signals DELAY(YH), DELAY(MH), DELAY(CH), in accordance with the detection output. The amounts represented by the signals DELAY(YH), DELAY(MH) and DELAY(CH) are respectively stored in margin registers MR(YH), MR(MH) and MR(CH).

For example, a program counter PC(YV) starts to count the signal BD(Y) after the signal TOP(Y) is generated and then when the counted value in the counter PC(YV) reaches the value of the signal DELAY(YV) in the margin register MR(YV), the vertical synchronizing signal V-SYNC-Y is generated. In the same way, signals V-SYNC-M and V-SYNC-C are generated. On the other hand, a program counter PC(YH) starts to count a CLOCK signal after the signal BD(Y) is generated. When the counted value in the counter PC(YH) reaches the value of the DELAY(YH) signal in the margin register MR(YH), the horizontal synchronizing signal H-SYNC-Y is generated. In the same way, signals H-SYNC-M and H-SYNC-C are also generated. Therefore, those images are superimposed on the same position of the printing paper 12.

Figure 3:
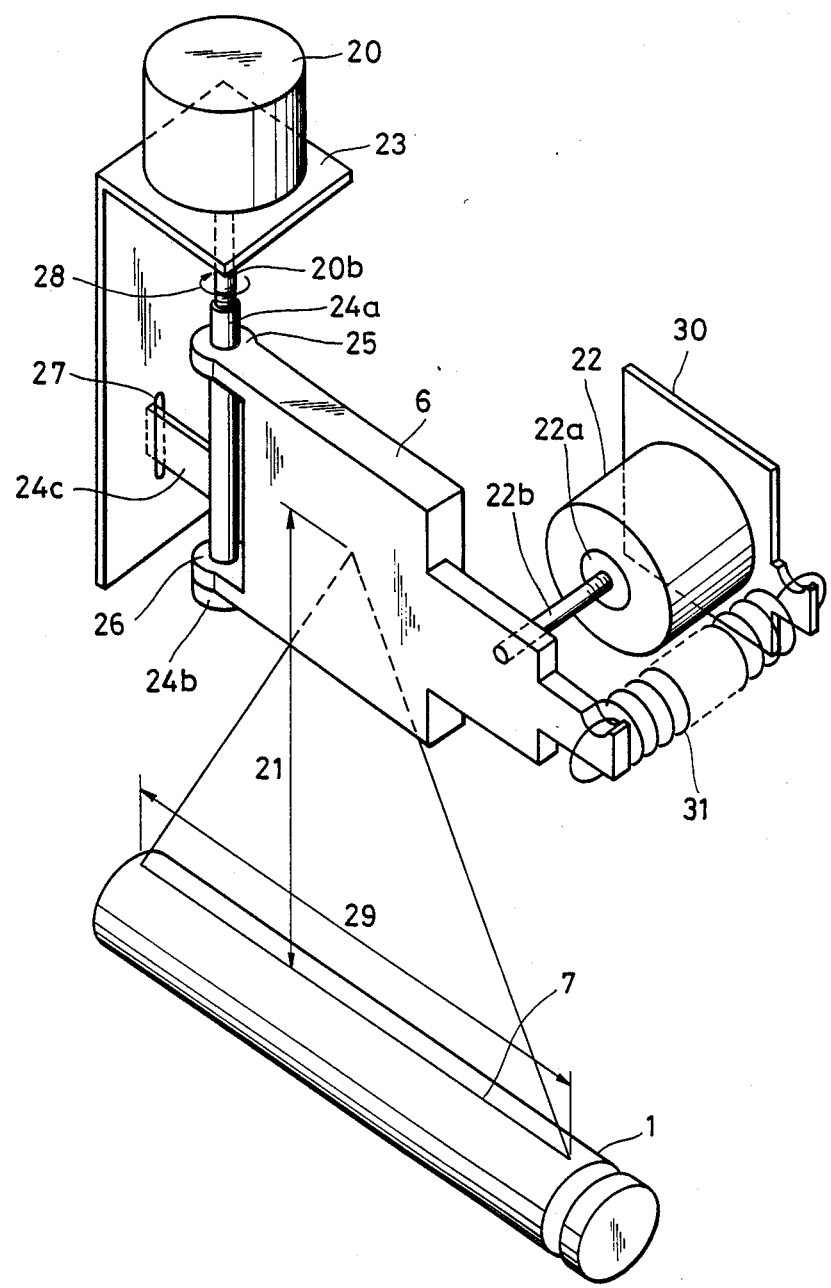
FIG. 3 is a schematic view of one recording station for explaining a method of adjusting an optical box.

FIG. 3 is provided for showing an adjusting method for adjusting the one optical box 6. All optical boxes have the same structure and functions. As shown in FIG. 3 each motor 20 is mounted on a bracket which is a part of a main apparatus frame. A collar 24a is secured in holes 25 and 26 at one side of the box 6. A stop 24b is fixed at the lower end of the collar 24a, and the stop 24b supports the box from the lower side. In the middle of the collar 24a, a rotation stop 24c is fixed. This stop 24c is received in a hole of the bracket 23, so that the collar 24a is prohibited from rotating.

The optical length adjusting motor 20 is a pulse motor, and has a shaft 20b which is turned as a male screw. The collar 24a is tapped as a female screw, so that the shaft 20b is threaded into the collar 24a. Assuming these screws are right-hand screws, when the shaft 20b is rotated in the direction shown by an arrow 28, the box 6 rises. On the other hand, where the shaft 20b is rotated in the direction opposite shown by an arrow 28, the box 6 goes down. As the result, the optical path length 21 may be adjusted.

The optical box rotating motor 22 is also a pulse motor and is fixed on a stay 30. A coil spring 31 in tension is coupled between the stay 30 and the optical box 6. A rotor 22a of the motor 22 is tapped as a female screw. A rod 22b is turned as a male screw and is received in the rotor 22a. Therefore, if the rotor 22a of the motor 22 rotates, the rod 22b moves forward and backward. The end of the rod 22b is fixed to the box 6, so as not to rotate relative to the box 6. Therefore, the raster line 7 can be inclined to the axis of the drum 1 by operation of the motor 22.

An explanation of how to correct for misregistration about the yellow image follows. Misrepresentations with respect to the magenta and cyan images are corrected in substantially the same way as with respect to the yellow image.

FIG. 4 through FIG. 7 are top views of the belt 8 in FIG. 1, and particularly illustrate the imaging points 14b and 15b of the imaging devices 14 and 15.

Figure 4:
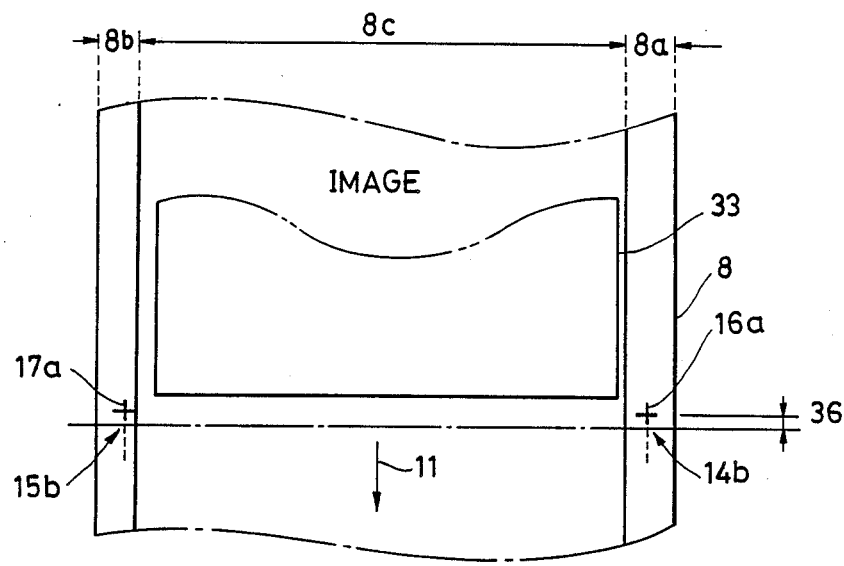
FIG. 4, FIG. 5, FIG. 6 and FIG. 7 are top views illustrating a pair of imaging points of a pair of imaging devices.

As shown in FIG. 4, the yellow image 33 is formed on the transferring belt 8 by using the electrophotographic method. The registration marks 16a and 17a are formed in the registration mark areas 8a and 8b outside of the middle transferred-image area 8c, also by using the electrophotographic method. The belt 8 moves in the direction shown by an arrow 11.

The imaging devices 14 and 15 image the registration marks 16a and 17a at the time when the marks should pass the fixed imaging points 14b and 15b, in response to a signal from the sequence controller.

In the case shown in FIG. 4, the imaging devices 14 and 15 do not detect the registration marks 16a and 17a at the time these marks should be detected due to a misregistration. Namely the marks 16a and 17a are recorded at a vertical delay. An amount 36 corresponding to the delay is detected, and the value DELAY(YV) is deduced in response to the amount 36. As a result, the phase of the signal V-SYNC-Y is determined, and the vertical misregistration can be compensated.

Figure 5:
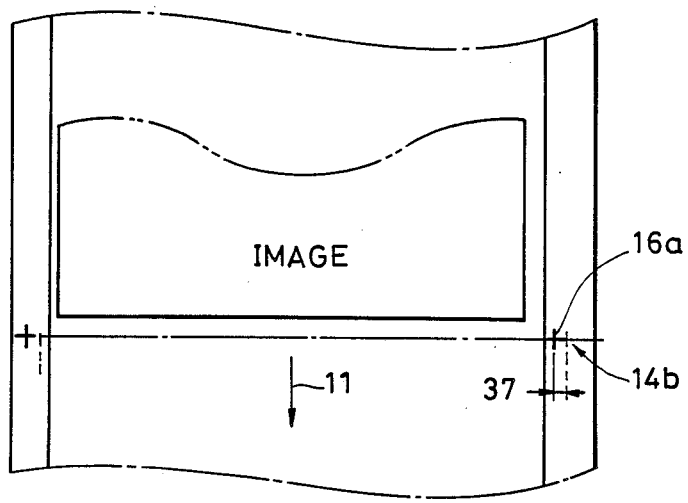

As shown in FIG. 5, the image 33 is shifted horizontally, in this case by an amount 37 between the imaging point 14b and the mark 16a, which is detected by the imaging device 14. Then the value DELAY(YH) is deduced in response to the amount 37. As a result, the phase of the signal H-SYNC-Y is determined, and the horizontal misregistration can be compensated.

Figure 6:
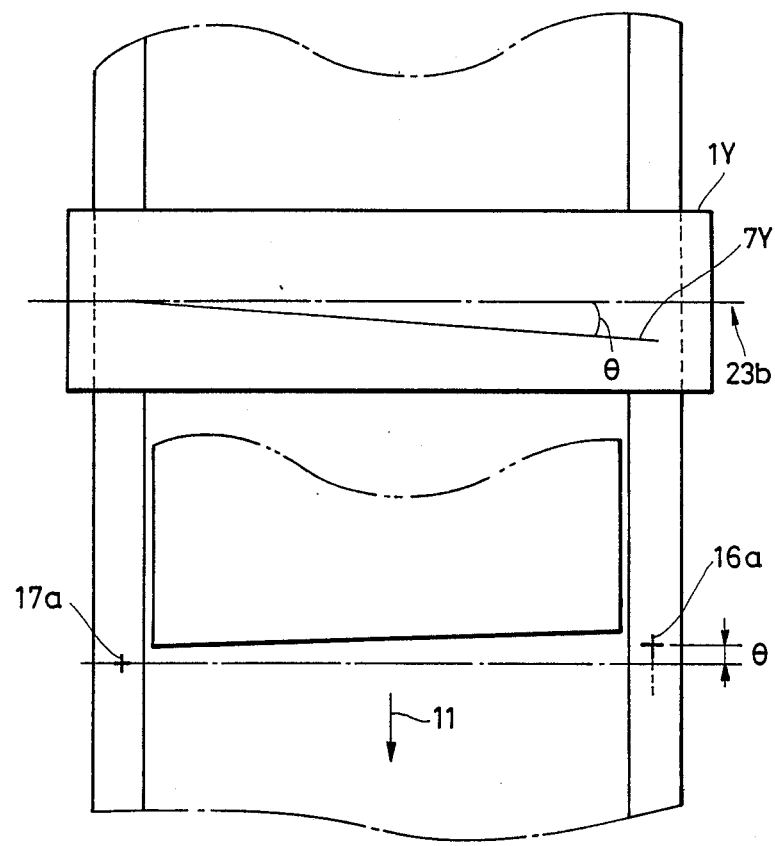

As shown in FIG. 6, the axis 23b of the drum 1Y is not coincident with but is inclined with respect to the optical raster 7Y. In this case, the imaging devices 14 and 15 detect the inclined angle θ between the line connecting the marks 16a and 17a and the line connecting the imaging points 14b and 15b. Then the raster 7Y is inclined in the direction shown by an arrow A by θ degree. In FIG. 3, if the rod 22b is driven backward by the rotation of the pulse motor 22, the axis 23b of the drum 1Y and the optical raster 7Y may be made coincident.

Figure 7:
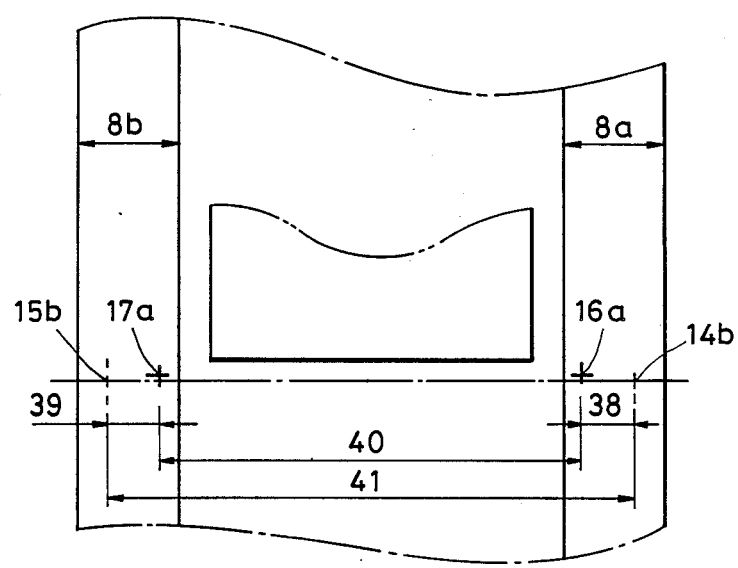

FIG. 7 shows a state in which an optical magnitude of the image is not correct. Referring to FIG. 3, the imaging devices 14 and 15 detect lengths 38 and 39 and detect a first ratio of a length of the line 40 to that of the line 41, which is the appropriate distance between the marks 16a and 17a. The line 40 connects the marks 16a and 16b, and the line 41 connects between the imaging points 14b and 15b. Then a triangle, which resembles the triangle in FIG. 3, having the same second ratio of the height (optical path length 21) to the base length (the raster length 29), is derived, and a vertical shifting amount of the box 6 is calculated using the first and second ratios. As a result, the error in the magnitude of the image is compensated for by rotating the shaft 20b of the pulse motor 20 on the direction shown by an arrow 28.

Thus as explained above, this embodiment corrects and compensates for all kinds of misregistrations of the yellow color image. Such operations are performed for the other color images in the same fashion as described with reference to yellow image above.

Now referring to FIG. 8, misregistration between the color images is corrected as follows. In this case, the imaging devices 14 and 15 are assumed to be one-dimensional CCD sensors which are known in the art of facsimile apparatus.

Figure 8:
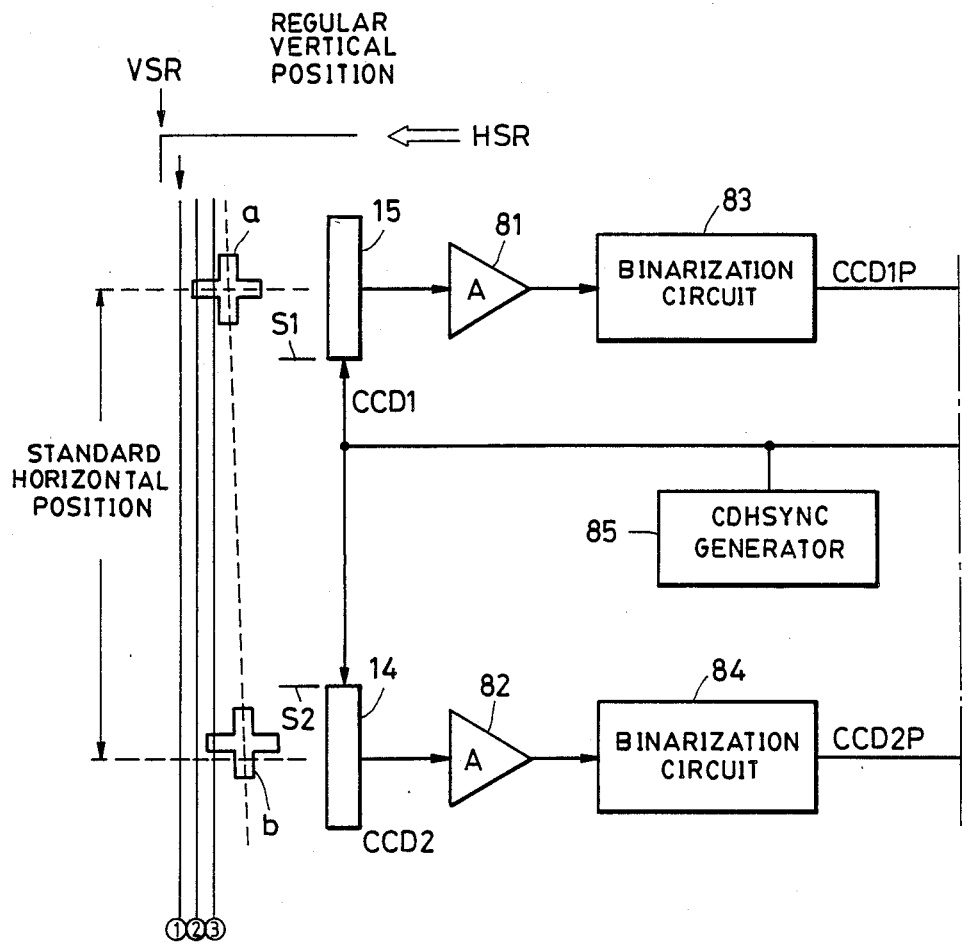
FIG. 8 is a block diagram of a circuit for adjusting or correcting registration between superimposed images.
Figure 8:
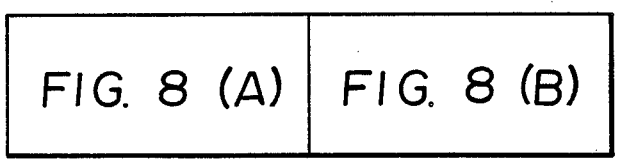
Figure 8:
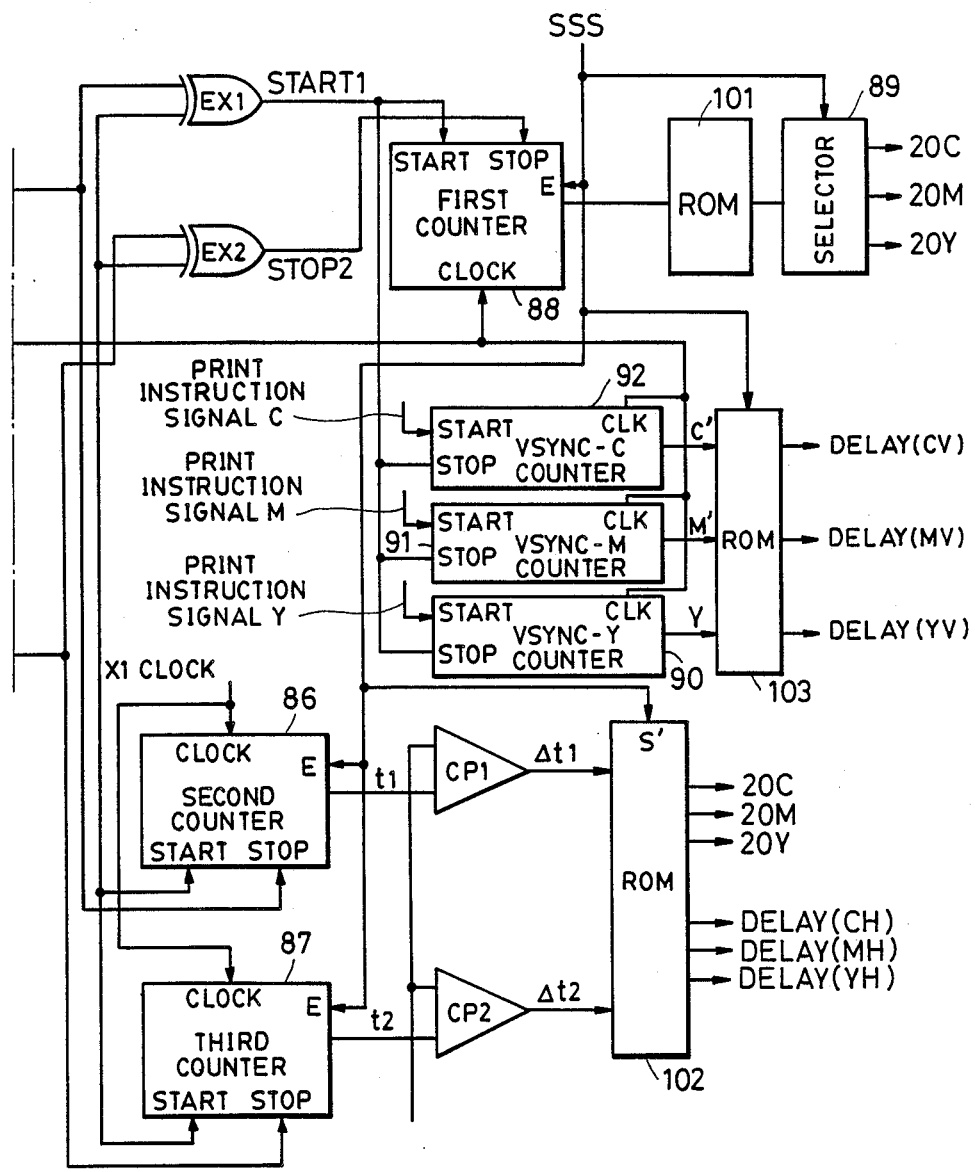

In FIG. 8, the registration marks a and b are printed at different positions from regular positions to be printed. The mark a is printed vertically shifted from the regular position. The mark b is printed vertically and horizontally shifted from the regular position. A line connecting the marks a and b is therefore inclined to the axis of the drum. Further, the length of the line connecting the marks a and b is shorter than the regular length. The mark b is inside the horizontal regular position. Namely, the optical raster is inclined, the magnitude of the image is smaller than the standard, and the vertical start time of image printing is later than the regular time.

Output signals from the CCDs 15 and 14 are respectively amplified by amplifiers 81 and 82 and binarized by binarization circuits 83 and 84. The binarization circuits 83 and 84 respectively output binary signals CCD1P, CCD2P in response to output signals from CCDs 15 and 14.

The imaging devices 15 and 14 are installed at the predetermined positions designated by standard positions S1 and S2. If the registration marks are printed such that the optical raster is not inclined, the magnitude of the image is equal to the regular magnitude, and the vertical start time and the main scanning start time are the same as the predetermined start times, the imaging devices 15 and 14 simultaneously detect the marks and produce the same symmetrical wave output signals. The CCDs 15 and 14 are simultaneously and respectively scanned in the direction shown by arrows A1 and A2 from standard positions S1, S2.

Figure 9:
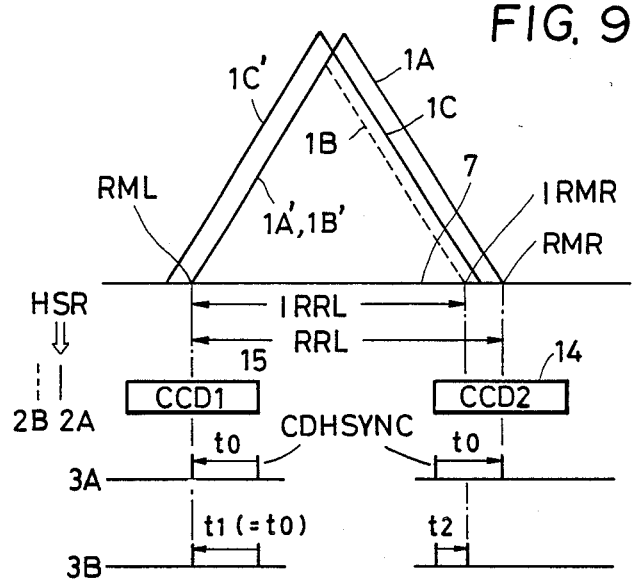
FIG. 9 is a diagram showing a relationship between the registration marks and outputs of the imaging devices.

FIG. 9 shows print positions of irregularly printed registration marks when the optical magnification and starting print positions are not correct. FIG. 9 also shows the regular print positions of the regular registration marks and relationship between positions of the registration marks and the positions of the imaging devices 15 and 14.

A pair of scanning beams 1A and 1A' write regular registration marks RMR, RML. The length RRL of a regular raster 7 between the two regular registration marks RMR and RML is therefore standard. On the other hand, a pair of scanning beams 1B and 1B' may write irregular registration marks IRMR, RML. The length IRRL of an irregular raster between the two irregular registration marks IRMR and RML therefore deviates from the standard.

A pair of binary output wave signals 3A are provided when the CCDs 15 and 14 respectively read the two regular registration marks RMR and RML. On the other hand, a pair of binary output wave signals 3B are provided when the CCD 15 and 14 respectively read the two irregular registration marks IRMR and RML.

Both output wave signals 3A constitute detecting signals for indicating that the registration marks are regular when time t0 passes after two horizontal synchronizing signals CDHSYNC for the two CCD 15 and 14 are generated.

On the other hand, both output wave signals 3B constitute detecting signals for indicating that the registration marks IRMR and RML are irregular when one CCD (15) produces a detecting signal at time $t1(=t0)$ after the signal CDHSYNC is generated, and the other CCD (14) produces a detecting signals at time t2, shorter than t0, after the signal CDHSYNC is generated.

As above mentioned, when the time interval t2 is shorter than the time interval t0, the optical magnitude is smaller than the regular optical magnitude. Of course, if the time interval t1 or t2 is longer than the time interval t0, the optical magnitude is greater than the regular optical magnitude.

Further if the magnitude alone is corrected, a triangle defined by scanning beam as bounded at 1C, 1C' results, but the horizontal positions of the registration marks are not correct, as can be seen in FIG. 9.

Figure 10:
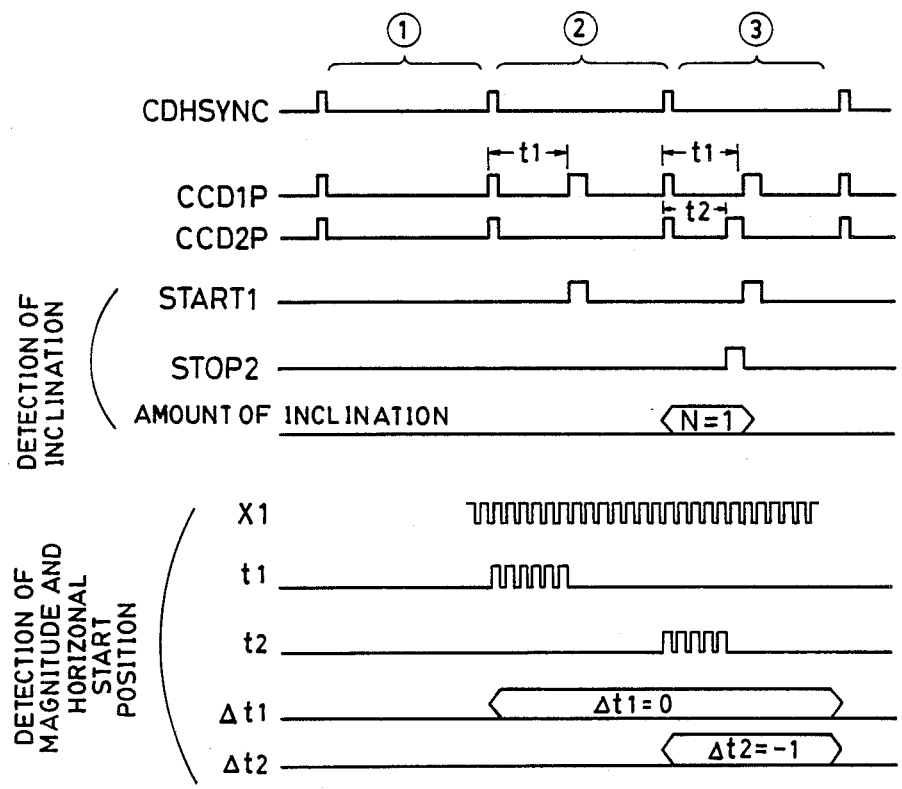
FIG. 10 is a timing chart representing a plurality of signals produced in the circuit shown in FIG. 8.

With reference to FIG. 8 and FIG. 10, an explanation will be provided of detection of the difference between the regular magnitude and actual magnitude, of the difference between the regular horizontal position and actual horizontal position of the registration marks, and of the inclination of the axis between the two registration marks.

The imaging devices 15 and 14 output periodically image signals in synchronizm with the CCD horizontal syncronizing signals CDHSYNC provided by a CDHSYNC generator 85.

The periods 1, 2 and 3 in FIG. 10 respectively coincide with the scanning lines 1, 2 and 3 in FIG. 8. Of course, there may be many more than three scanning lines. The imaging devices 15 and 14 read sequentially and in rapid succession scanning lines 1, 2, 3, and the binary imaging signals CCD1P and CCD2P are output from the binarization circuits 83, 84 in response to such reading.

In the case shown in FIG. 8, the imaging devices 15 and 14 first read the scanning line 1, where the regular registration marks should be printed. However, the actual registration marks are not so printed so that the signals CCD1P and CCD2P do not indicate any mark detection.

Then, as shown in FIG. 8, the imaging devices 15 and 14 read the scanning line 2 where only the registration mark a appears, so that the signal CCD1P constitutes a mark detecting signal at the time $t1(=t0)$. However the mark b does not appear at scanning line 2 so the signal CCD2P does not indicate any mark detection.

Thereafter, the imaging devices 15 and 14 read the scanning line 3 where the registration marks a and b both appear, so that the signal CCD1P constitutes a mark detecting signal produced at time t1, and the signal CCD2P also constitutes a mark detecting signal produced at time $t2(<t0)$.

A second counter 86 counts the time interval t1 and a third counter 87 counts the time interval t2. A clock input terminal CLOCK of each counter 86 and 87 receives a clock signal X1. The clock signal X1 is used for detecting the divergence of the optical magnitude, so that frequency of the clock signal X1 is much greater than that of the signal CDHSYNC and should be equal to that of a driving or transfer clock signal for the imaging devices 15 and 14.

The signal CDHSYNC from the generator 85 is input to each starting terminal START of the second and third counters 86 and 87 in order to start counting N. The signals CCD1P and CCD2P are respectively input to stopping terminals STOP in order to stop counting.

The second counter 86 starts counting the signal X1 upon generation of the signal CDHSYNC, and stops counting at generation of the mark detecting signal constituted by the signal CCD1P. Then the second counter 86 outputs a count value t1, which corresponds to the time interval t1.

Similarly, the third counter 87 starts counting the signal X1 upon generation of the signal CDHSYNC, and stops counting at generation of the mark detecting signal constituted by the signal CCD2P. Then the second counter 87 outputs a count value t2 which corresponds to the time interval t2.

The count values t1 and t2 respectively are compared to a regular count value t0, corresponding to the time interval t0, by the comparators CP1 and CP2. The difference $\Delta t1$ between the values t1 and t0 and the difference $\Delta t2$ between the values t2 and t0 are respectively output from the comparators CP1 and CP2.

A read only memory (ROM) 102 is provided for correcting or compensating for the divergences of optical magnitude and the regular horizontal position. The differences $\Delta t1$ and $\Delta t2$ are input to the ROM 102, which outputs a first control amount representing a moving amount to be produced by the optical length adjusting motor 20C, and a second control amount representing horizontal shift amounts DELAY(CH) for delaying the horizontal timing signal BD(C), even though the horizontal position is shifted by the correction of the magnitude.

Therefore, the magnitude and the horizontal starting position are corrected or adjusted to regular states. The correction of the magnitude and the horizontal starting position at the cyan station has been described. The same corrections at the magenta station and the yellow station are respectively then determined. As a result, the magnitudes and horizontal starting positions of all stations are corrected. Terminals E of the counters 86 and 87 is used for resetting count values in order to obtain control data for all stations.

Next, the correction of the inclination of the raster or the inclination between the raster and the axis of the drum will be described with reference to FIG. 8 and FIG. 10.

When the imaging devices 15 and 14 read the scanning line 1, the detecting signal CCD1P causes a START1 signal to be generated from an exclusive OR gate EX1. The signal START1 causes a first counter 88 to start counting by being input to a terminal START of the first counter 88. On the other hand, even when the imaging device 14 reads the scanning line 2, it does not generate a mark detecting signal.

Then, when the imaging devices 15 and 14 read the scanning line 3, the detecting signal constituted by the signal CCD2P causes a signal STOP2 to be generated from another exclusive OR gate EX2. The signal STOP2 causes the first counter 88 to stop counting by being input to a terminal STOP thereof.

The first counter 88 counts the signal CDHSYNC after the signal START1 is generated until the signal STOP2 is generated.

Therefore a count value by the first counter 88 represents the inclination amount N of the raster. In the case illustrated with reference to this embodiment N equals 1, as shown in FIG. 10, because marks a and b are detected only one scanning line apart.

A ROM 101 is provided for correcting or compensating for the inclination of the raster. The count value N is input to the ROM 101, which outputs a signal representing driving amounts of the optical box rotating motor 22, in accordance with the count value N, to the motor 22 of the optical station designated by a selector 89 using the station select signal SSS.

Thus the raster axis between the pair of registration marks is adjusted to coincide with the axis of the drum.

The correction of the raster axis at the cyan station has been described above. The same corrections for each of the magenta station and the yellow station is determined by reference to the succeeding registration marks using by the signal SSS. At the result, the raster axis inclination is corrected at all stations.

Finally, the correction of the divergence of the vertical standard print position is described below.

Each of counters VSYNC-C 92, VSYNC-M 91, VSYNC-Y 90 counts the amounts representing divergence of the vertical print position from the regular position.

The counter VSYNC-C 92 starts counting the signal CDHSYNC, input to terminal CLK, in response to the input to a terminal START of a print instruction signal for instructing printing of the cyan registration mark.

The counter 92 stops counting the signal CDHSYNC in response to the generation of the mark detecting signal represented by the signal CCDP1. In this case, this signal is generated first when the CCD15 reads the second scanning line 2, so that the actual print position is shifted from the regular vertical position.

A ROM 101 is provided for correcting or compensating for the divergence of the vertical print position, and the ROM 101 outputs the amount DELAY(CV) of delay of the vertical timing signal TOP(C).

Therefore, the vertical print position of the cyan station is compensated for or corrected.

The same correction for the magenta and yellow stations is respectively processed using the station select signal SSS.

As the registration marks are recorded periodically the imaging device 15 detects the registration marks periodically. Therefore, the counters 90, 91, 92 are controlled, by a predetermined control signal, so as not to stop counting in response to a mark detecting signal in response to a mark representing a registration mark related to a color different from that of the counter actually counting.

Figure 11:
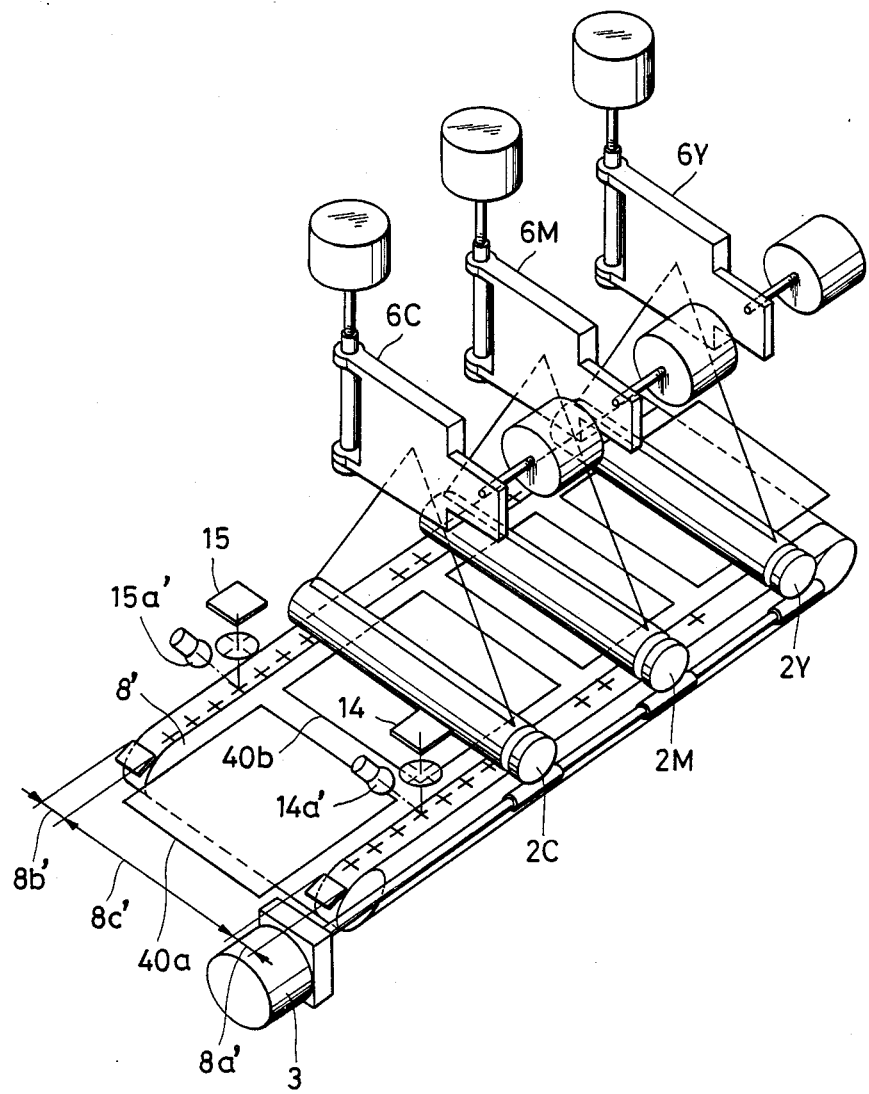
FIG. 11 through FIG. 17 are schematic views, similar to FIG. 1, of color printers respectively illustrating other embodiments of the present invention.

FIG. 11 shows a second embodiment of the present invention. In this embodiment, elements illustrated in the same manner as in the first embodiment are the same functional elements as in the first embodiment. A transferring belt 8' is used as a transporting medium for transporting out sheets 40a, 40b and is not an intermediate transferring material.

In this case, polyimide film or urethane rubber film is suitable as the substance of the belt 8' because their characteristics are acceptable for transporting the electrophotographic transferring sheets. As mentioned above, these substances are orange colored and similar to yellow and magenta, so that it is difficult to detect the yellow or magenta registration marks by a reflection detecting method.

However, in the second embodiment, the belt 8' is separated into a transporting area 8c' and two detecting areas 8a', 8b'. The transporting area 8c' is made of polyimide film or urethane rubber film, but the detecting area is made of a transparent medium. A pair of lamps 14a' and 15a', which are installed on the same side as the imaging devices 14 and 15, illuminate the registration marks. The registration marks, recorded on the transparent medium, reflect a part of the incident light, and the imaging devices can detect the registration marks with a high signal to noise (S/N) ratio.

Figure 12:
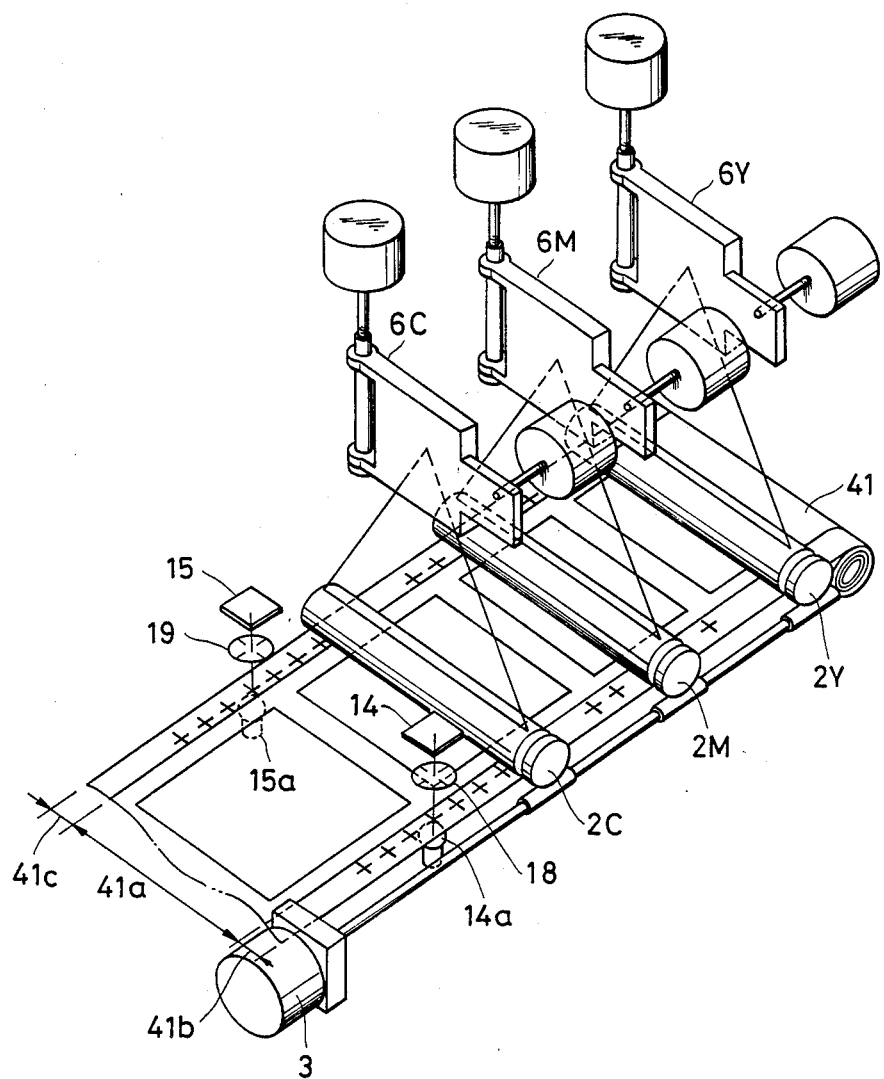

FIG. 12 shows a third embodiment of the present invention. In the third embodiment, as a transferring medium, a long roll paper 41 is used. The roll paper 41 constitutes an image printing area which is not transparent, that separates two a detecting areas 41b and 41c that are constituted by a transparent film attached to the back of the paper in the roll 41.

Other elements in FIG. 12 represent the same elements described with reference to the first embodiment.

Figure 13:
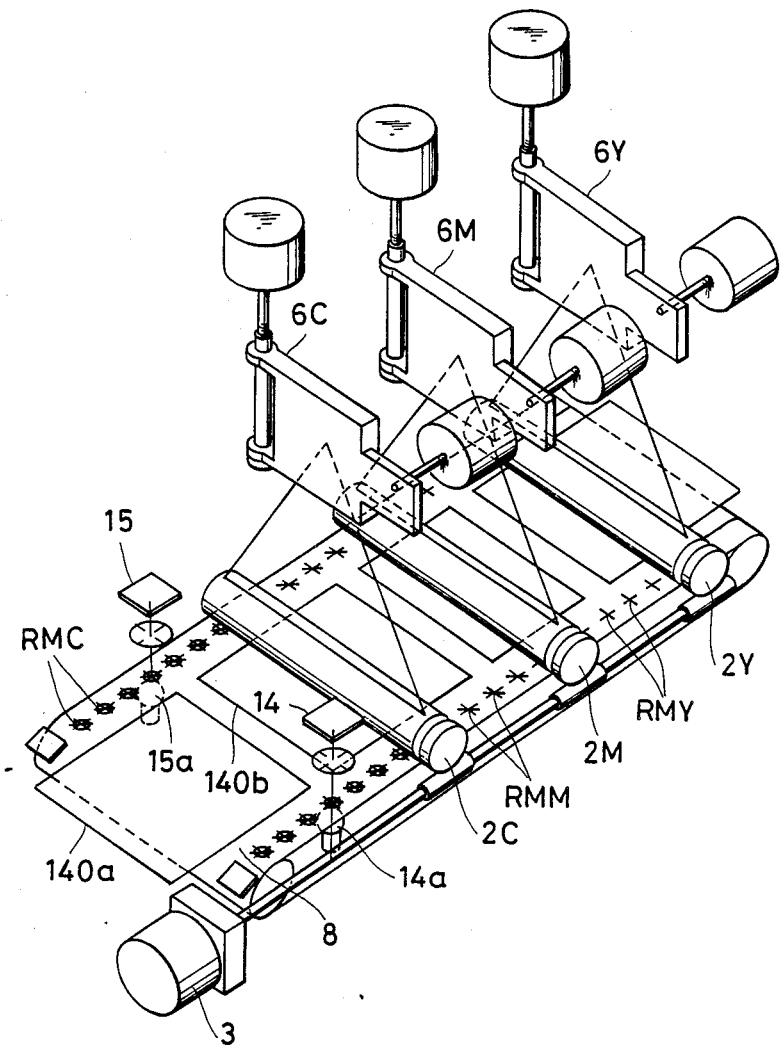

FIG. 13 shows a fourth embodiment of the present invention. In this embodiment, elements having the same reference numbers as in the first embodiment represent the same functional elements as in the first embodiment.

As mentioned above, polyimide film and urethane rubber film are orange colored and similar to yellow and magenta, so that it is difficult to detect the yellow or magenta registration marks by a reflection detecting method.

In the fourth embodiment, a transporting belt 108 is used for transporting cut sheets 140a, 140b, and so on, and is made of polyimide film or urethane rubber film. These substances are not transparent. In this embodiment, the registration marks have different shapes depending on the color thereof as shown by RMC, RMM, RMY.

RMC are the cyan registration marks. RMM are the magenta registration marks. And RMY are the yellow magenta registration marks.

Therefore, since the color difference is detected by the shape, a processing circuit can detect the registration marks with a high S/N ratio.

Figure 14:
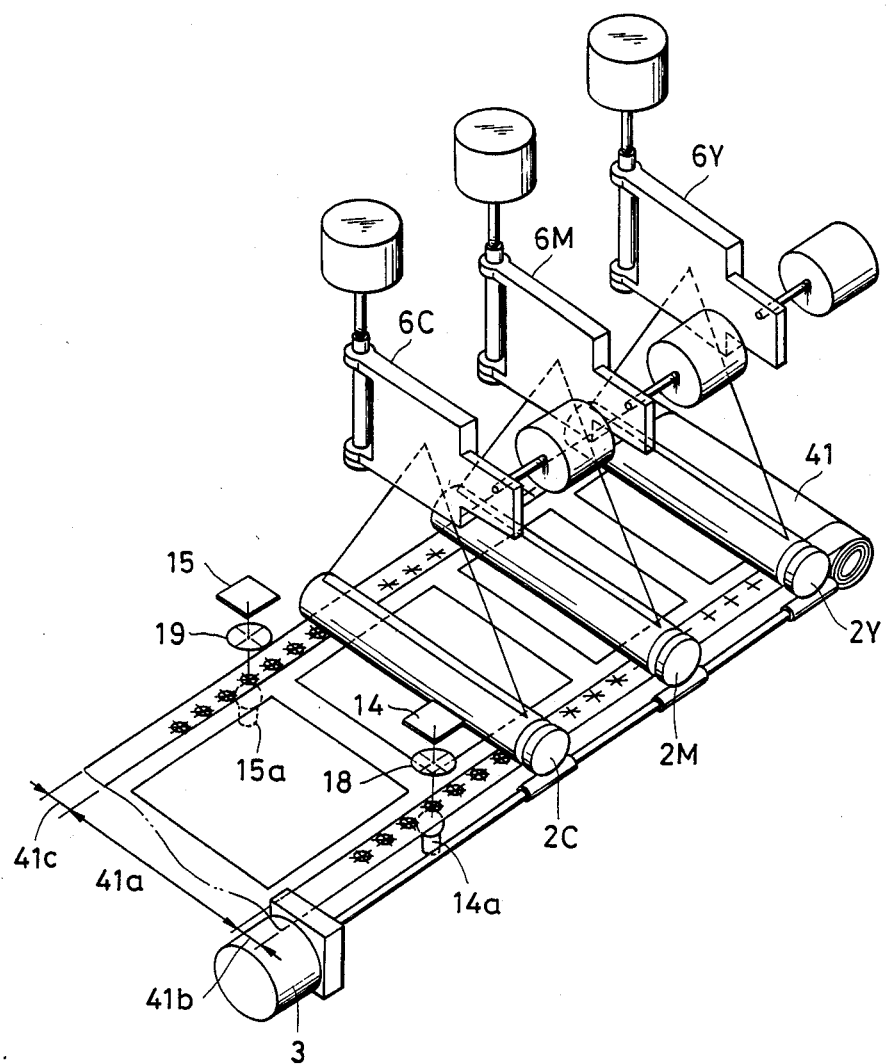

FIG. 14 shows a fifth embodiment of the present invention. In this embodiment, as well as the third embodiment, as a transferring medium, a long roll paper 41 is used. The roll paper 41 constitutes an image printing area, which is not transparent, and separates two detecting areas 41b and 41c made of transparent film and attached to the back of the paper in the roll 41.

As in the fourth embodiment, the registration marks have a different shapes corresponding to the color thereof. In this case, a processing circuit can detect the registration marks with high S/N ratio.

In FIG. 13 and FIG. 14, as well as FIG. 1, the lamps 14a, 15a are installed on the side of the transparent film opposite the image sensors 14, 15.

Figure 15:
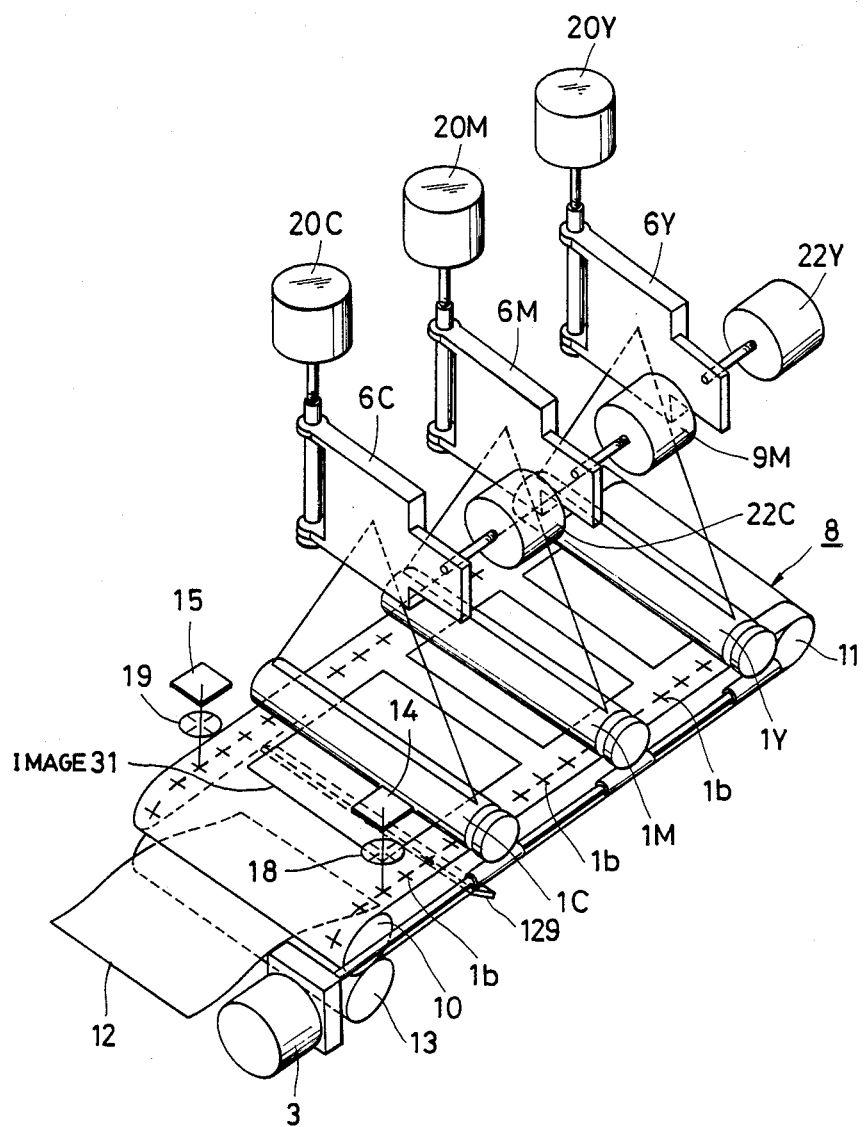

FIG. 15 shows another embodiment. In this embodiment, a cleaning blade 129 is installed downstream of the transferring roller 13 for the belt 8. The cleaning blade 129 spans the entire width of the belt 8, so that the blade 129 can eliminate not only the registration marks but also toner images not transferred at the transferring station.

Figure 16:
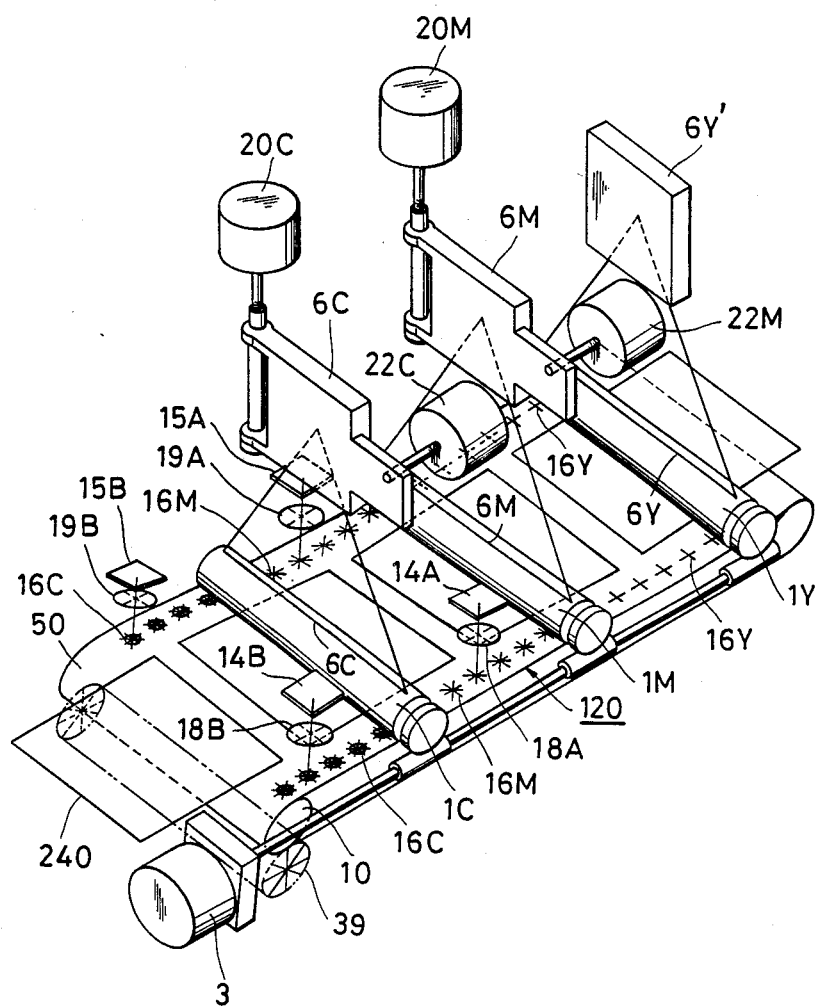

FIG. 16 shows still a further embodiment. In an image forming apparatus of this embodiment, a belt 50 transports cut sheets 240 to which images are transferred, and the cut sheets 240 are placed at the predetermined position on the belt 50. An optical box 6Y' for forming a cyan image does not have any correcting or adjusting mechanism. The magenta registration marks 16M are X-shaped, and the cyan registration marks are circles.

The registration marks 16Y, 16M are detected by a pair of area (two-dimensional) image sensors 14A, 15A, and the marks 16Y, 16M and 16C are detected by a pair of area image sensors 14B, 15B.

A fur brush cleaner 39 is provided for eliminating or removing the registration marks 16Y, 16M, 16C on the transporting belt 50.

Figure 17:
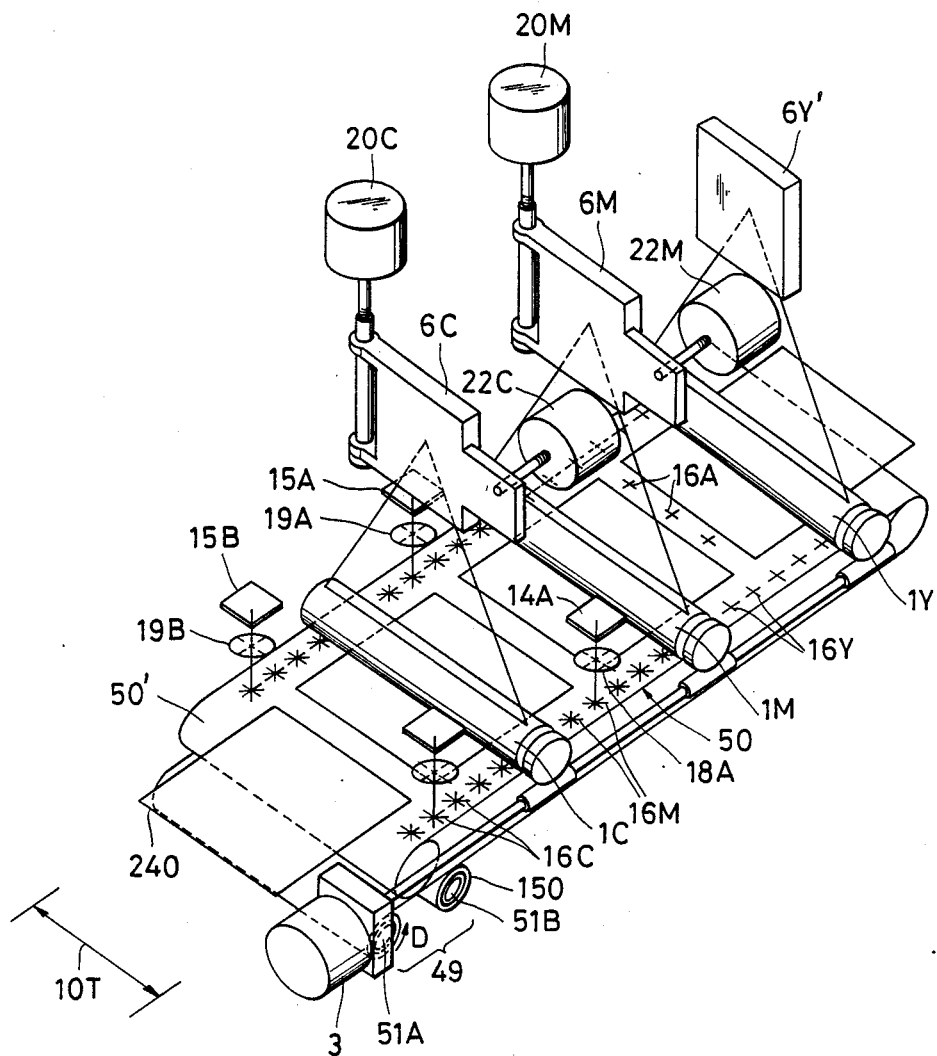

FIG. 17 shows another embodiment of the present invention. In this embodiment, a web cleaner 49 is provided for eliminating the registration marks instead of the fur brush cleaner 39 in FIG. 17.

The web cleaner 49 has a cleaning sheet 150 for cleaning the belt '50, a supply roll 51B for supplying the sheet 150 and a winding roll SYA for winding up the sheet 150 in the direction shown by the arrow D. The sheet 150 wipes the belt 50 and eliminates the marks 16 on the belt 50.

The registration marks 16A might be printed on the center of the belt 50 and are not limited to being printed at the sides of the belt. In the image forming apparatus having the transporting belt 50 for transporting the cut sheets 240 on which the registration marks are to be transferred to the belt 50, the registration marks might be transferred to the belt rather than on the cut sheets 240. For example, as shown in FIG. 17, such registration marks 16A may be printed in a transferring area 10T between the sheets 240 on the belt 50. This invention also includes this feature.

According to the present invention, the image forming apparatus is able to form high quality superimposed images without misregistration. The image forming apparatus is able to detect registration marks with a high S/N ratio. For example, the detector devices detect the registration marks as shadows, so that, even though the color difference between the film and the mark is small, the detector accurately can discriminate the marks.

Although particular embodiments of the present invention are herein disclosed for purposes of explanation, various modifications thereof, after study of this specification, will be apparent to those skilled in the art to which the invention pertains.

What is claimed is:

1. An image forming apparatus for forming superimposed images, comprising:
    an image holder for holding a plurality of images;
    a moving member for assisting in transfer of the images formed on said image holder, said moving member having a transparent region for receiving a recorded registration mark;
    a detector for detecting the registration mark on said transparent region of said moving member and for producing a detection signal representing the detection; and
    correcting means for adjusting the position at which at least one of the plurality of images is held by said image holder in accordance with the detection signal produced by said detector.

2. An image forming apparatus according to claim 1, wherein said image holder includes a plurality of holding elements each for respectively for holding the plurality of images.

3. An image forming apparatus according to claim 1, wherein said moving member comprises an image transferring medium for temporarily holding each of the plurality of images.

4. An image forming apparatus according to claim 1, wherein said moving member comprises image holding paper for directly receiving each of the plurality of images.

5. An image forming apparatus according to claim 1, wherein said detector detects the registration mark by detecting light reflected from the mark on said transparent region.

6. An image forming apparatus according to claim 1, wherein said detector detects the registration mark by detecting changes in light transmitted through said transparent region.

7. An image forming apparatus for forming superimposed images, comprising:
an image holder for holding a plurality of images;
a moving member for assisting in transfer of the images formed on said image holder, said moving member having a region for receiving a recorded registration mark;
a light source for illuminating the registration mark from the one side of said moving member;
a detector mounted on a side of said moving member opposite said one side for detecting a shadow of the registration mark when illuminated by said light source, and for producing a detection signal representing the detection; and
adjusting means for adjusting the position at which at least one of said plurality of images is held by said image holder in accordance with the detection signal produced by said detector.

8. An image forming apparatus according to claim 7, wherein said image holder includes a plurality of holding elements each respectively for holding the plurality of images.

9. An image forming apparatus according to claim 7, wherein said moving member comprises an image transferring medium for temporarily holding each of the plurality of images.

10. An image forming apparatus according to claim 7, wherein said moving member comprises image holding paper for directly receiving each of the plurality of images.

11. An image forming apparatus for forming superimposed images, comprising:
an image holder for holding a plurality of images;
a moving member for assisting in transfer of the images formed on said image holder, said moving member having a region for receiving a recorded registration mark;
a detector for detecting the registration mark recorded at said region and for producing a detection signal representing the detection;
adjusting means for adjusting the position at which at least one of the plurality of images is held on said image holder in accordance with the detection signal produced by said detector; and
removing means for removing the registration mark from said region after said detector detects the mark.

12. An image forming apparatus according to claim 11, wherein said image holder includes a plurality of holding elements respectively for holding the plurality of images.

13. An image forming apparatus according to claim 11, wherein said moving member comprises an image transferring medium for temporarily holding each of the plurality of images.

14. An image forming apparatus according to claim 13, wherein said removing means removes the registration mark from said transferring medium before the mark is transferred from the transferring medium.

15. An image forming apparatus according to claim 11, wherein said moving member comprises image holding paper for directly receiving each of the plurality of images.

16. An image forming apparatus according to claim 11, wherein said removing means comprises a blade contacting with said moving material.

17. An image forming apparatus according to claim 11, wherein said removing means comprises a brush.

18. A superimposed image forming apparatus according to claim 11, wherein said removing means is comprises by a web cleaner.

19. An image forming apparatus for forming superimposed images, comprising:
a plurality of image holders each respectively for holding an image;
a plurality of image forming means each respectively for forming an image on each said image holders; and
adjusting means respectively for adjusting all except one of said image forming means, and thereby for adjusting the position at which at least one of the images is formed on said image holders by said image forming means except the image formed by said one of said image forming means to prevent misregistration of the images on each of said image holders by all of said image forming means.

20. An image forming apparatus according to claim 19, further comprising a member for assisting in transfer of the images from said plurality of image holders and having a region for receiving a recorded registration mark, and a detector for detecting the registration mark recorded at said region and for producing a detection signal representing the detection, and wherein said adjusting means adjusts all except said one of said image forming members in accordance with the detection signal produced by said detector.

21. A superimposed forming apparatus according to claim 19, wherein said one of said image holders is the image holder positioned to receive an image first prior to receipt by said remaining image holders of an image.

* * * * *